(No Model.) 3 Sheets—Sheet 1.
J. F. STEWARD.
HARVESTER.
No. 564,724. Patented July 28, 1896.
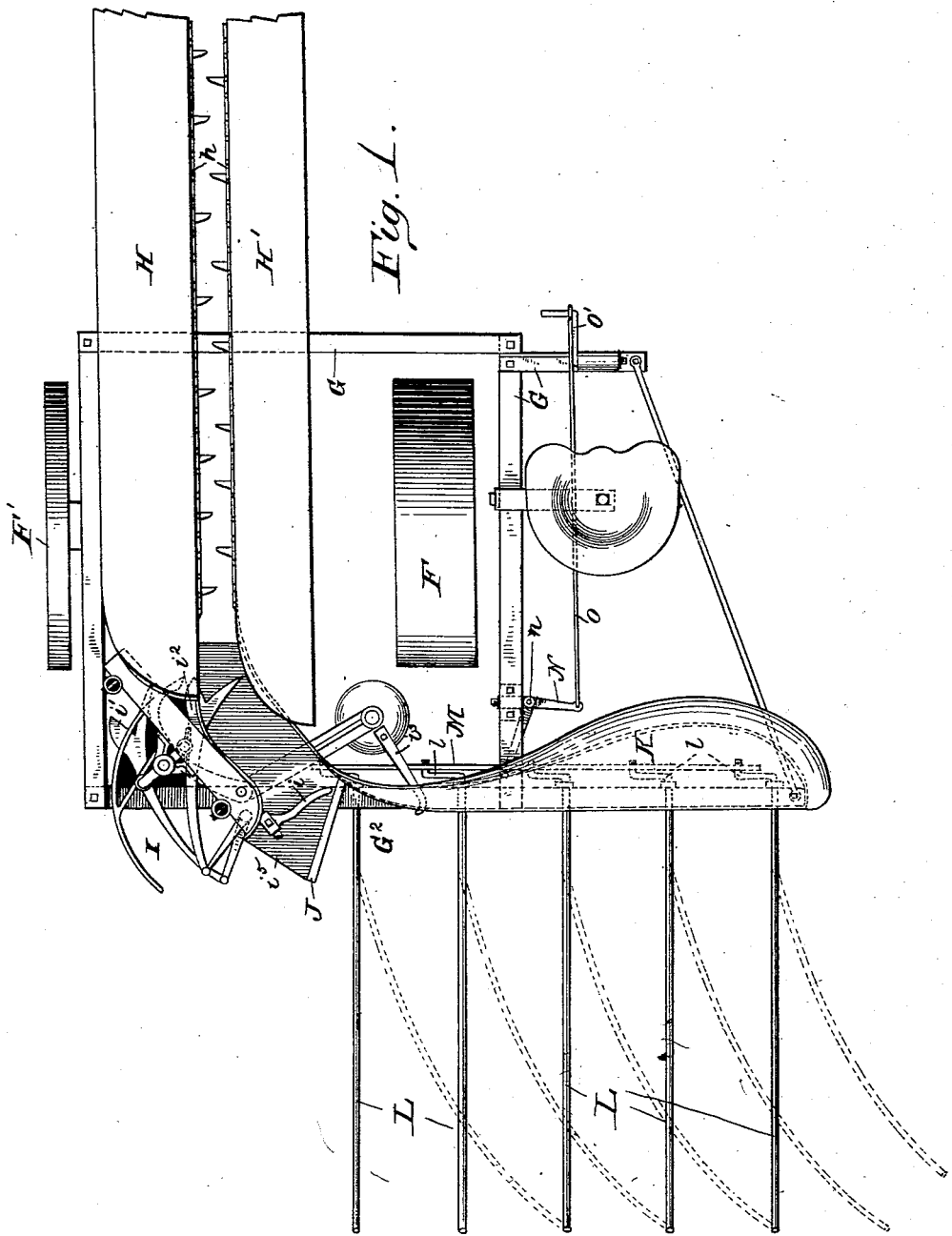
Witnesses
Arthur Johnson
R. Ray Thurman
Inventor
John F. Steward

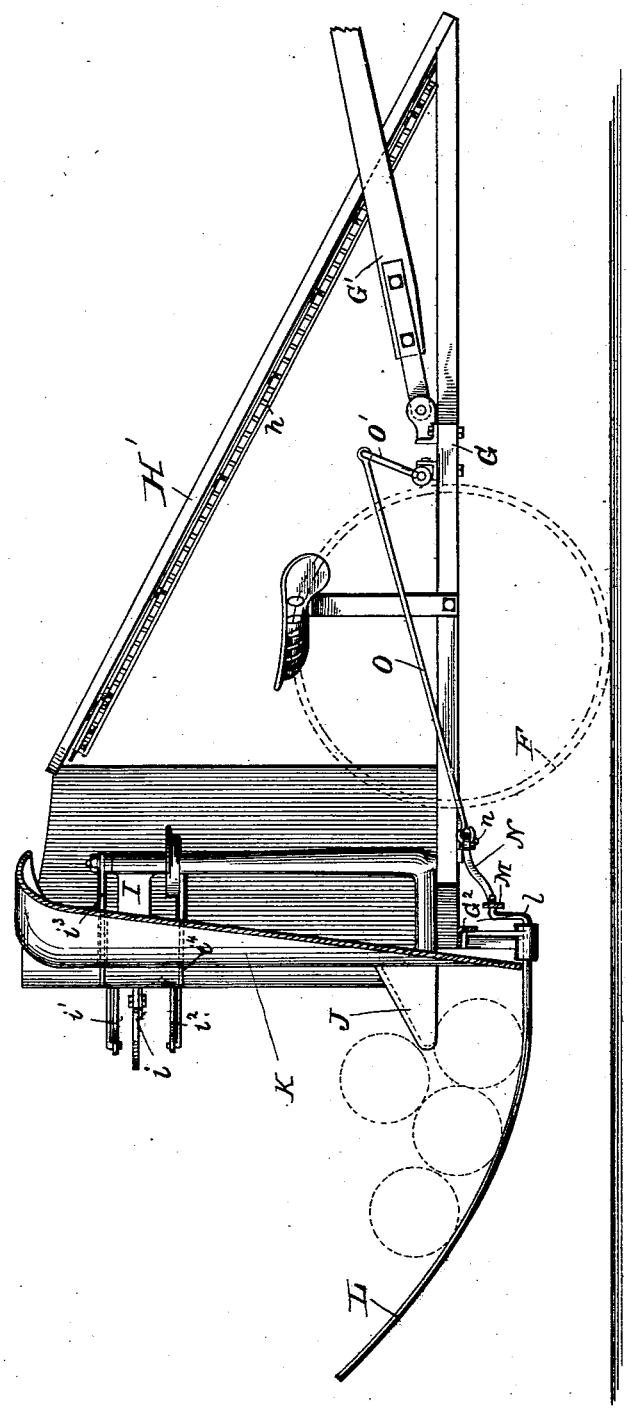

(No Model.)   J. F. STEWARD.   3 Sheets—Sheet 3.
HARVESTER.
No. 564,724.   Patented July 28, 1896.
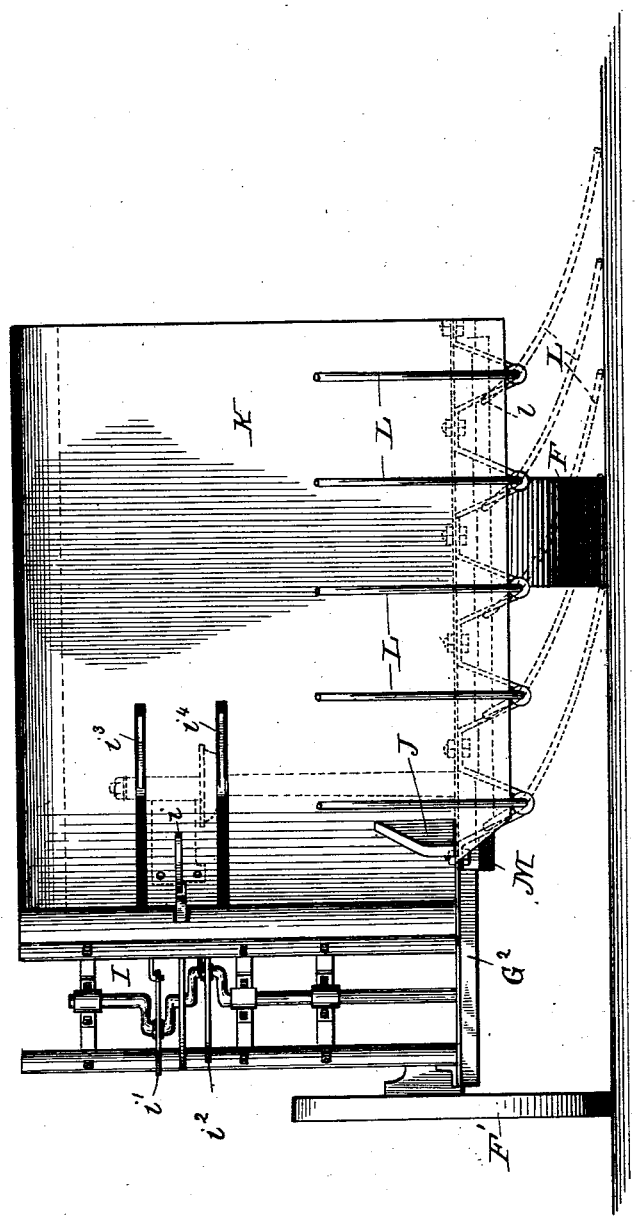
Witnesses.
Arthur Johnson
Inventor:
John F. Steward

UNITED STATES PATENT OFFICE.

JOHN F. STEWARD, OF CHICAGO, ILLINOIS.

HARVESTER.

SPECIFICATION forming part of Letters Patent No. 564,724, dated July 28, 1896.

Application filed June 26, 1895. Serial No. 554,166. (No model.)

*To all whom it may concern:*

Be it known that I, JOHN F. STEWARD, of Chicago, in the county of Cook and State of Illinois, have invented certain new and useful Improvements in Harvesters, of which the following is a full description, reference being had to the accompanying drawings, in which—

Figure 1 is a plan view. Fig. 2 is a sectional elevation. Fig. 3 is a rear elevation.

My invention pertains to harvesters in which the stalks of corn, or any grain being operated upon, are cut and carried to a receptacle and there bound in substantially an upright position. It is shown in the drawings as attached to a machine adapted to the cutting of corn when planted in rows.

The carrying-wheels F and F' are suitably located in the frame G.

G' is the draft-tongue.

The corn is gathered in the slot formed by the gatherers H and H', and is carried by the chains $h$ shown, or any well-known means, in an upright position to the binder I, which binder stands in a substantially vertical position. The said binder operates to pack the corn or grain cut and coming from the gatherers against the resistant $i$, by means of the packers $i'$ and $i^2$, until a sufficient quantity of stalks has accumulated to form a bundle, when the said resistant will yield and throw the parts directly concerned in the operation of binding into engagement with the driving mechanism. The band-placing and band-uniting devices then perform their offices in the usual manner. At the discharge end of the binding-table $i^5$ a stop J is provided, against which the butts may form and which acts to retard the said butts during the time in which the bundle is being moved by the discharge-arms. The discharge-arms $i^3$ and $i^4$ act upon the bundle at points adjacent to the band, and owing to the fact that the stop J retards the butts, the said stop and discharging devices together cause the bundle to be prostrated.

K is a guiding-surface extending from the binder in a direction substantially stubbleward and may have its upper edge shaped flaringly, the purpose of which surface being to guide the tops of the bundles as they fall stubbleward from the binder on to the bundle-carrier portion of the machine.

The receiving-platform of the carrier may consist of a series of projecting rods journaled upon horizontal axes and adapted to be rocked outwardly to discharge the load, or the platform may be made of wood and drop at its delivery end. In the form of carrier shown the fingers L project rearwardly from their supports in the rear sill $G^2$ of the frame G. The rearwardly-projecting fingers may be curved upwardly, as best shown in Fig. 2, so as to form a rearward limit to the carrier-platform. By curving the fingers as described they will, if rocked from the position shown in full lines in the drawings through an angle of substantially ninety degrees, swing the load stubbleward and then form a downwardly and stubblewardly declined surface, down which the bundle may slide to the ground. The stubbleward movement of the load is desirable, as it moves the said load so far from the row being cut as to leave plenty of horse room in cutting the next row. Cranks $l$ are formed upon the forward ends of the fingers, and are adapted to be attached to the finger-controlling bar M, in order that each finger may be rocked simultaneously with the others. Suitable mechanism for operating the fingers to discharge the load may be attached to the framework of the machine and extended to a position adjacent to the driver's seat.

I show in the drawings a desirable device for thus operating the carrier, in which N is a bell-crank lever pivoted at $n$ upon the main frame, having one arm adapted to engage the finger-controlling bar, and the other arm connected by means of the link O to a pedal-crank O', adjacent to the driver's seat.

The discharge-arms and the stop J may be considered the particular means chosen whereby the bundles are moved from their upright to their prostrated position.

What I claim as my invention, and desire to secure by Letters Patent, is—

1. In a corn-harvester, the combination of a substantially vertical binder to which the corn is conducted and by which it is bound in standing position, a dumping-carrier located relatively to the binder to receive the bound corn directly therefrom, and means for transferring the bound corn from its standing position in the binder to and upon the carrier in a prostrate position perpendicular to the direction of travel of the machine.

2. In a corn-harvester, the combination of a substantially vertical binder to which the corn is conducted and by which it is bound in standing position, a dumping-carrier located stubbleward from the binder and adapted to receive the bound corn directly therefrom, and means for transferring the bound corn from its standing position in the binder to and upon the carrier in a prostrate position perpendicular to the direction of travel of the machine.

3. In a corn-harvester, the combination of a substantially vertical binder to which the corn is conducted and by which it is bound in standing position, a dumping-carrier located in position relatively to the binder to receive the bound corn directly therefrom, means for inclining the top part of the bundle of bound corn toward the carrier, and means for simultaneously retarding the movement of the butts of the bundle, said two mechanisms operating to effect the delivery of the bundle upon the carrier in a prostrate position perpendicular to the direction of travel of the machine.

4. In a corn-harvester, the combination of a substantially vertical binder to which the corn is conducted and by which it is bound in standing position, a dumping-carrier located stubbleward from the binder and adapted to receive the bound corn directly therefrom, and means for transferring the bound corn from its erect position in the binder to a prostrate position on the carrier perpendicular to the direction of travel of the machine, said carrier-platform being constructed and adapted to move stubbleward from its receiving position in dumping the load.

JOHN F. STEWARD.

Witnesses:
ARTHUR JOHNSON,
R. RAY SHUMAN.